United States Patent

Hirabayashi et al.

[11] Patent Number: 6,067,147
[45] Date of Patent: *May 23, 2000

[54] DISTANCE-MEASURING APPARATUS

[75] Inventors: Takehide Hirabayashi; Hideo Shimizu, both of Tokyo; Akio Izumi, Nagano, all of Japan

[73] Assignee: Fuji Electric Co., Ltd., Kawasaki, Japan

[*] Notice: This patent is subject to a terminal disclaimer.

[21] Appl. No.: 09/166,569

[22] Filed: Oct. 6, 1998

Related U.S. Application Data

[63] Continuation-in-part of application No. 09/003,129, Jan. 6, 1998.

[30] Foreign Application Priority Data

| Jan. 9, 1997 | [JP] | Japan | 9-001800 |
| Jul. 18, 1997 | [JP] | Japan | 9-194008 |
| Nov. 5, 1997 | [JP] | Japan | 9-302518 |

[51] Int. Cl.[7] .............. G01C 3/00; G01C 3/08; G01C 5/00; B60T 7/16
[52] U.S. Cl. .......... 356/3.14; 180/167; 356/4.02
[58] Field of Search .................. 356/4.02, 3.14; 180/167

[56] References Cited

U.S. PATENT DOCUMENTS

| 5,233,382 | 8/1993 | Taniguchi et al. . | |
| 5,850,254 | 12/1998 | Takano et al. | 180/167 |

*Primary Examiner*—Stephen C. Buczinski
*Attorney, Agent, or Firm*—Kanesaka & Takeuchi

[57] ABSTRACT

A distance-measuring apparatus is formed of a photographic device formed of a pair of image-forming lenses and photosensor arrays for taking images of an object through the image-forming lenses, and a calculating device electrically connected to the photosensor arrays for calculating a distance to an object to be measured by two images of the object taken by the photographic device based on a triangulation principle. The calculating device calculates the distance to the object by an amount of shift determined based on an inter-optical-axis distance of the pair of image-forming lenses and photographed images of a reference object having a pattern of a periodic structure repeated at an interval same as the inter-optical-axis distance; a difference in offsets of image-forming positions on the photosensor arrays caused by a medium located between the apparatus and the measured object, with the difference being detected based on the amount of the shift; and an amount of shift detected when the distance to the measured object is measured.

6 Claims, 7 Drawing Sheets

DISTANCE-MEASURING APPARATUS

CROSS-REFERENCE TO RELATED APPLICATION

This is a continuation in part application of Ser. No. 09/003,129 filed on Jan. 6, 1998.

BACKGROUND OF THE INVENTION AND RELATED ART STATEMENT

The present invention relates to a distance-measuring apparatus such as an inter-vehicle distance-measuring apparatus used to prevent collision between vehicles.

Conventional techniques for an inter-vehicle distance-measuring apparatus for measuring the distance to a leading vehicle are described.

A conventional inter-vehicle distance-measuring apparatus electrically compares images formed by two lateral optical systems to measure the distance based on the triangulation principle.

Figure 4:
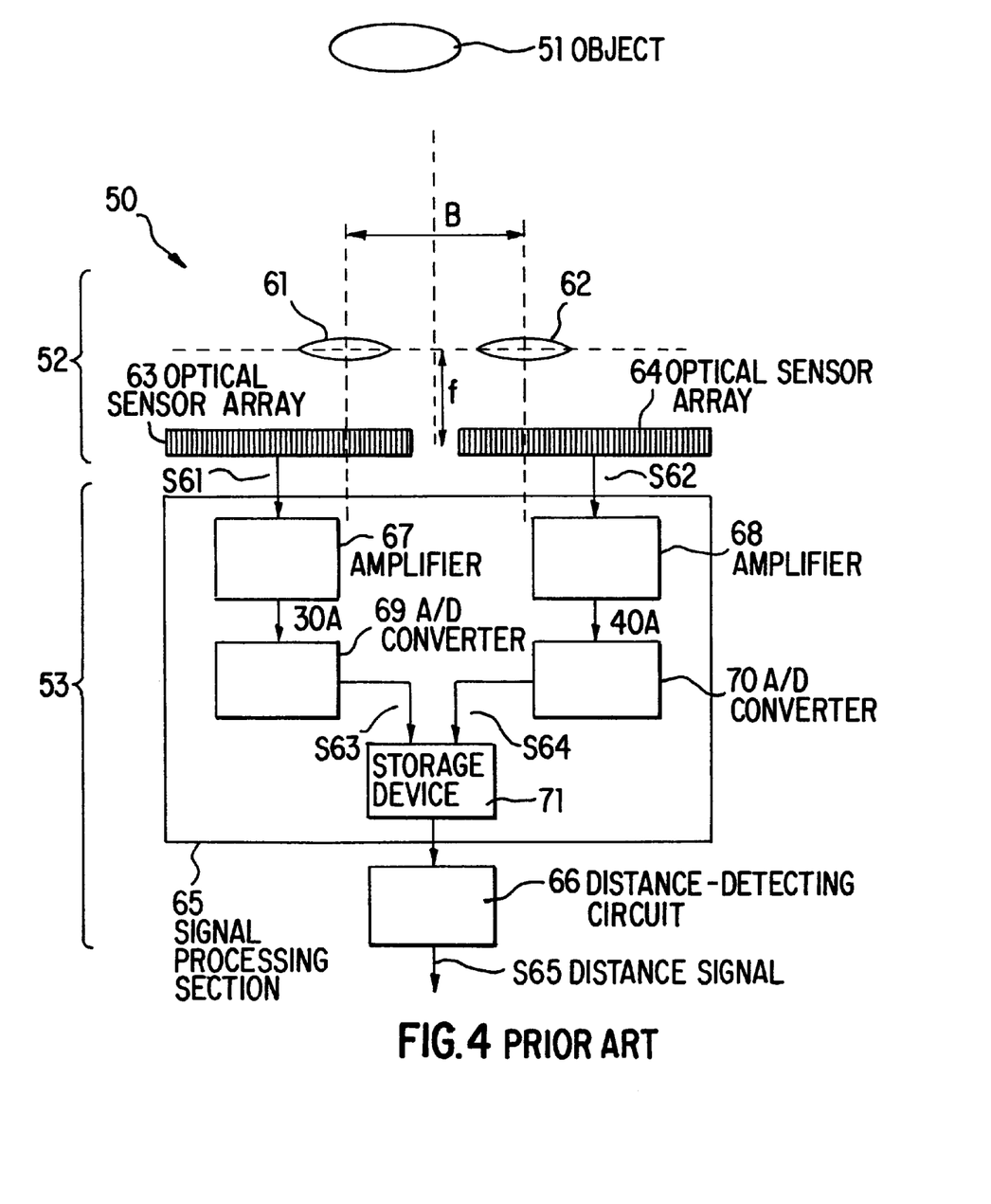
FIG. 4 is a block diagram showing a conventional inter-vehicle distance-measuring apparatus.

FIG. 4 is a block diagram showing a conventional inter-vehicle distance-measuring apparatus 50 of this type. The apparatus 50 comprises a pair of photographic means 52 for photographing or taking images of an object 51; and calculating means 53 for calculating the distance to the object 51 based on the images obtained by using the photographic means 52.

The photographic means 52 is composed of a pair of image-forming lenses 61 and 62, and a pair of photosensor arrays or optical sensor arrays 63 and 64. The calculating means 53 is composed of a signal-processing section 65 and a distance-detecting circuit 66.

In FIG. 4, the image forming lenses 61 and 62 are spaced at an inter-optical-axis interval or distance B. The photosensor arrays 63 and 64 are, for example, CCD linear sensors located at the focal distance (f) from the image-forming lenses 61 and 62, respectively.

The photosensor arrays 63 and 64 convert images formed by the image-forming lenses 61 and 62 into image signals S61 and S62, and output signals to the signal-processing section 65.

The signal-processing section 65 is formed of amplifiers 67 and 68, A/D converters 69 and 70, and a storage device or memory 71. The image signals S61 and S62 from the photosensor arrays 63 and 64 are amplified by the amplifiers 67 and 68, and are converted by the A/D converters 69 and 70 into digital data, which are then outputted to the storage device 71 as image data S63 and S64.

The distance-detecting circuit 66 provided on the output side of the signal-processing section 65 is composed of a microcomputer, which compares the right and left image data S63 and S64 stored in the storage device 71, calculates the distance to the object 51, and outputs a distance signal S65.

The principle of the distance calculations is described below with reference to FIG. 5.

The middle-point between the optical axes of the image-forming lenses 61 and 62 is set as an origin O to set a horizontal axis X and a vertical axis Y. The coordinates of image-forming positions $L_1$ and $R_1$ are defined as $(-a_{L1}-B/2, -f)$ and $(a_{R1}+B/2, -f)$, respectively. References $a_{L1}$ and $a_{R2}$ designate distances on the photosensor arrays 63 and 64 as shown in the figure.

The coordinates of the middle point $O_L$ of the image-forming lens 61 are $(-B/2, 0)$, and the coordinates of the middle point $O_R$ of the image-forming lens 62 are $(B/2, 0)$. If the coordinates of a point M of the object 51 are designated as $(x, y)$, the coordinates of the intersection N between the X axis and a line extending downward from the point M perpendicular to the X axis are $(x, 0)$; the coordinates of a position $L_o$, on the photosensor array 63, extending downward from the point $O_L$ perpendicular to the photosensor array 63 are $(-B/2, -f)$; and the coordinates of a position $R_o$, on the photosensor array 64, extending downward from the point $O_R$ perpendicular to the photosensor array 64 are $(B/2, -f)$. In this case, triangles $MO_L N$ and $O_L L_1 L_o$, and triangles $MO_R N$ and $O_R R_1 R_o$ are similar, respectively. Thus, Equations 1 and 2 are formulated.

$(x+B/2)f=a_{L1}\cdot y$      Equation 1

$(-x+B/2)f=a_{R1}\cdot y$      Equation 2

Equation 3 can be obtained from Equations 1 and 2.

Equation 3 enables the distances $a_{L1}$ and $a_{R1}$ for the image-forming positions $L_1$ and $R_1$ to be determined, and these values can be used to calculate a distance (y) to the measured object 51.

$y=B\cdot f/(a_{R1}+a_{L1})$      Equation 3

Next, an operation of the distance-detecting circuit 66 is described.

Figure 7:
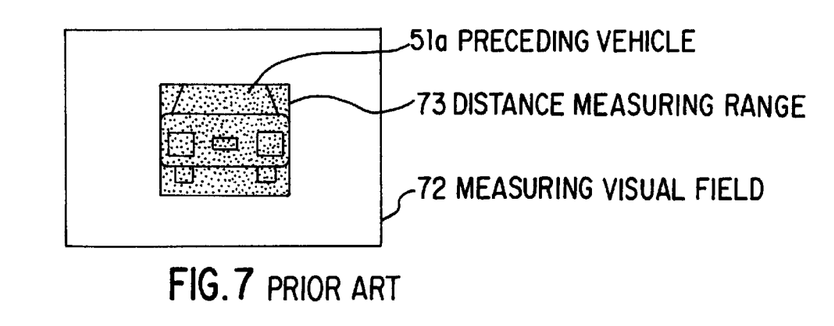
FIG. 7 is a schematic drawing showing an image.

The distance-detecting circuit 66 compares right and left image data 63R and 64L for a distance-measuring range 73 that has been separately set (see FIG. 7). If the images do no match, the distance-detecting circuit 66 sequentially shifts, for example, the left image data 63L to the right or the right image data 64R to the left. The circuit 66 detects an amount of shift $(a_{R1}+a_{L1})$ when the right and left image data are closest to a match.

The right and left data may not perfectly match because image-matching points may be present at certain spatial pixels or blank portions in the photosensor arrays 63 and 64.

The detecting circuit 66 calculates the distance (y) to the measured object 51 using the amount of shift $(a_{R1}+a_{L1})$ and Equation 3.

FIG. 7 schematically shows a normal image obtained during the detection of the distance to the leading or preceding vehicle 51a.

In this figure, the distance-measuring range 73 is set within a measuring visual field 72, and the distance to the measured object within the measuring range 73, i.e. the leading vehicle 51a, is detected based on the distance detection principle.

The installation of the inter-vehicle distance-measuring apparatus 50 in a vehicle compartment is advantageous in that the inter-vehicle distance-measuring apparatus need not be protected from dust or water, and that wipers of the vehicle can be utilized in rainy conditions.

Figure 8:
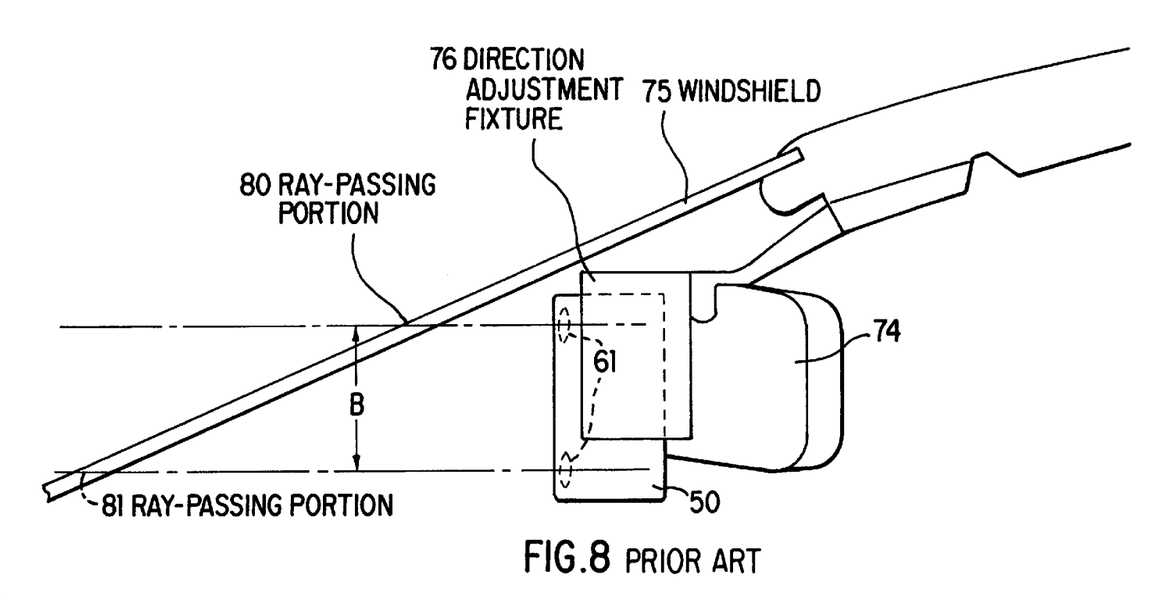
FIG. 8 is a sketch showing the installation of the inter-vehicle distance-measuring apparatus.

FIG. 8 is a sketch showing the inter-vehicle distance-measuring apparatus 50 installed in the compartment between a room mirror 74 and a windshield 75. The inter-vehicle distance-measuring apparatus 50 is fixed to a room mirror 74 via a direction adjustment device or fixture 76.

Figure 9A:
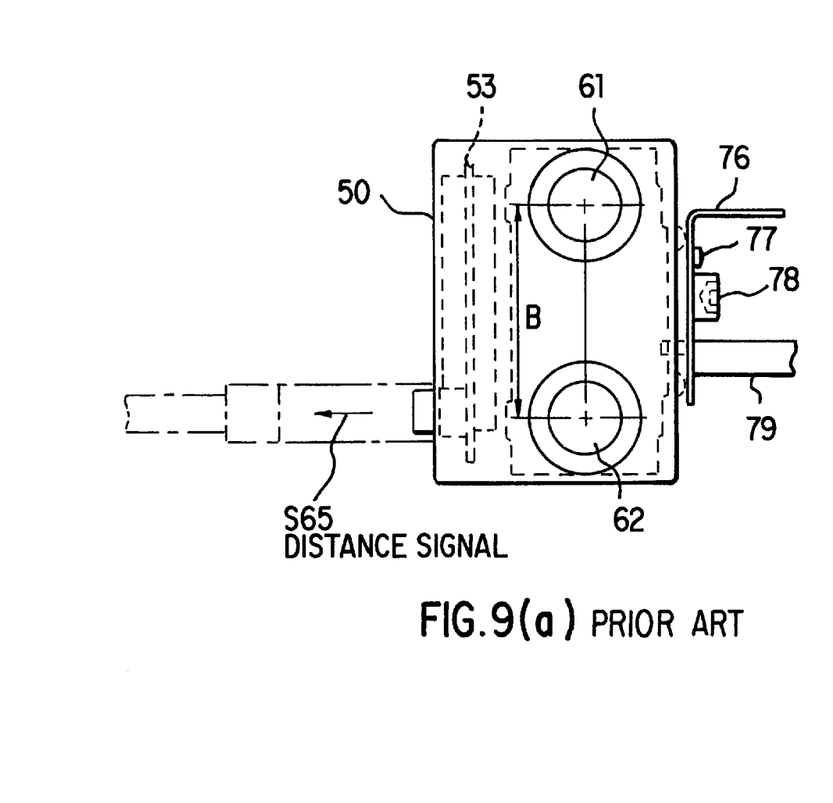
FIGS. 9(A) and 9(B) are sketches of an angle adjustment mechanism of the inter-vehicle distance-measuring apparatus.
Figure 9B:
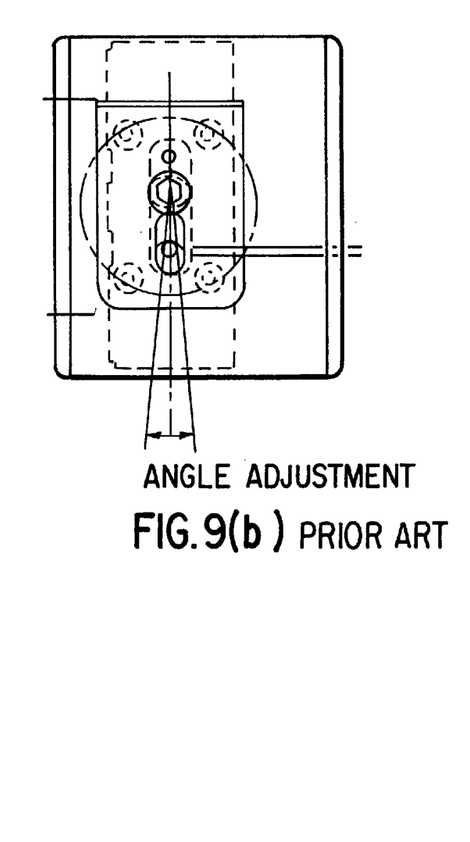

FIGS. 9(a) and 9(b) show an example of an angle adjustment mechanism of the inter-vehicle distance-measuring apparatus 50. The angle adjustment mechanism is composed of a direction adjustment device 76, a parallel pin 77, a fixation bolt 78, and an eccentric driver 79.

The direction adjustment device 76 is fixed to a part of a room mirror (not shown). An angle of the inter-vehicle distance-measuring apparatus 50 is adjusted as follows.

The fixation bolt 78 is loosened to rotate the eccentric driver 79. At this point, the inter-vehicle distance-measuring apparatus 50 fixed to the direction adjustment device 76 can be rotated around the parallel pin 77. The eccentric driver 79 is rotated to adjust the angle (direction) of the inter-vehicle distance-measuring-apparatus 50, and then, the fixation bolt 78 is tightened.

Installation of the inter-vehicle distance-measuring apparatus 50 in the compartment has many advantages as described above, but also has the following disadvantages.

The windshield 75 present between the measuring apparatus 50 and the object 51 to be measured causes an error in the distance signal S65 to reduce the accuracy in distance measurements executed by the inter-vehicle distance-measuring apparatus 50.

The effects of the windshield 75 include the non-uniform thickness of the windshield 75, the difference in the incident angles of light rays, incident on the image-forming lenses 61 and 62, relative to the windshield 75, and local variation of the refractive index of the windshield 75.

Figure 10:
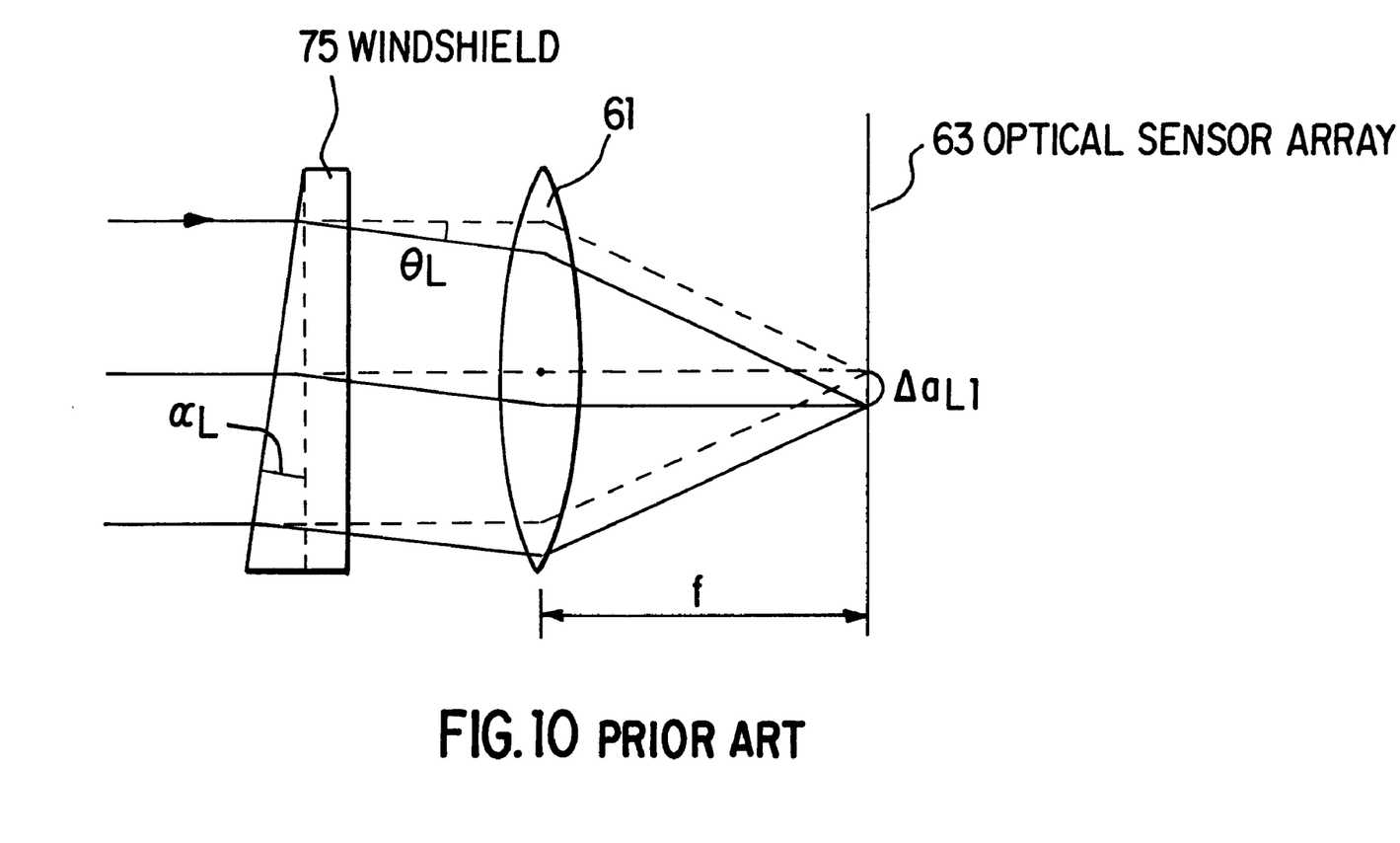
FIG. 10 is an explanatory drawing showing the effects of non-uniformity of a windshield for the accuracy in distance measurements.

FIG. 10 shows the effect of non-uniformity of the thickness of the windshield 75 on the accuracy in the distance measurements.

For the convenience of description, FIG. 10 shows that rays from points at infinity that are parallel to the optical axis of the image-forming lens 61 penetrate the windshield 75 of a non-uniform thickness and then enter the photographic means 52 consisting of the image-forming lens 61 and the photosensor array 63. It is assumed that the surface (first surface) of the windshield 75 is tilted at an angle $\alpha_L$ from the optical axis of the image-forming lens 61 and that the rear surface (second surface) of the windshield 75 is perpendicular to the optical axis.

The rays from the points at infinity that are parallel to the optical axis refract at the first and second surfaces of the windshield 75 and are tilted at an angle $\theta_L$ given by Equation 4 relative to the optical axis.

$$\theta_L \approx (n-1)\alpha_L \qquad \text{Equation 4}$$

In Equation 4, (n) is the refractive index of the windshield 75 relative to the wavelength of incident rays.

Thus, the position of the image-forming point on the photosensor array 63 is offset from the image-forming point (shown by the dotted line) obtained when the windshield 75 is not present, by $\Delta a_{L1}$ given by Equation 5.

$$\Delta a_{L1} = \theta_L \cdot f \qquad \text{Equation 5}$$

In Equation 5, (f) is the focal distance of the image-forming lens 61.

One lens 61 in the image-forming lenses and the photosensor array 63 constituting the photographic means 52 have been described, but this description is also applied to the other image-forming lens 62 and the photosensor array 64.

The inclination of a ray penetrating the windshield 75, relative to the optical axis of the image-forming lens 62 is denoted as $\theta_R$, and the offset of the image-forming position of this ray on the photosensor array (offset relative to the image-forming position obtained when the windshield 75 is not present) is denoted as $\Delta a_{R1}$.

As is apparent from FIG. 8, the actual inclination of the normal on each portion of the windshield relative to the incident ray is relatively large, in contrast to FIG. 10.

In addition, since the two image-forming lenses 61 and 62 are spaced at a distance B, rays incident on the image-forming lenses penetrate the windshield 75 at different positions (ray-passing portions) 80 and 81. Thus, the thicknesses of the windshield 75 differ at the positions 80 and 81, and the angles relative to the normal of the windshield are different at the incident rays incident at the positions 80 and 81.

Therefore, $\Delta a_{L1}$ and $\Delta a_{R1}$ have different values, and $\theta_L$ and $\theta_R$ have different values.

The difference $\Delta a$ in the offsets of the image-forming positions ($\Delta a_{L1}$ and $\Delta a_{R1}$) is expressed by Equation 6.

$$\Delta a = \Delta a_{L1} - \Delta a_{R1} = f(\theta_L - \theta_R) \qquad \text{Equation 6}$$

The amount $\Delta a$ expressed by Equation 6 corresponds to the error in the amount of shift, which corresponds to the error in distance signal S65.

This invention provides a distance-measuring apparatus that can measure a distance with improved accuracy even when a medium such as a windshield is present between the measuring apparatus and the measured object by correcting errors in distance measurements.

SUMMARY OF THE INVENTION

To achieve the object, in the first aspect of the invention, an amount of shift is detected in advance and is memorized based on photographed images of a reference object, which has the same interval as the inter-optical-axis distance of the pair of image-forming lenses and a pattern of a periodic structure, i.e. lines, repeated at the same interval.

The calculating means uses the amount of shift to determine the difference in the offsets of the image-forming positions on the photosensor arrays caused by a medium present between the apparatus and the object to be measured, and uses the difference in the offset and an amount of shift detected when the distance to the measured object is measured, in order to determine the distance to the measured object.

According to the second aspect of the invention, in the distance-measuring apparatus according to the first aspect, the apparatus has a direction adjustment mechanism for adjusting the mounting angle of the distance-measuring apparatus, so that images of the reference object are formed at predetermined positions of the photosensor arrays.

According to the third aspect of the invention, in the distance-measuring apparatus according to the first aspect, the apparatus includes a finder having an optical axis parallel to the optical axes of the image-forming lenses.

According to the fourth aspect of the invention, in the distance-measuring apparatus according to the third aspect, the finder is detachable.

DETAILED DESCRIPTION OF A PREFERRED EMBODIMENT

An embodiment of this invention is described below with reference to the drawings. Reference is made, if required, to the application Ser. No. 09/003,129 filed on Jan. 6, 1998.

Figure 1:
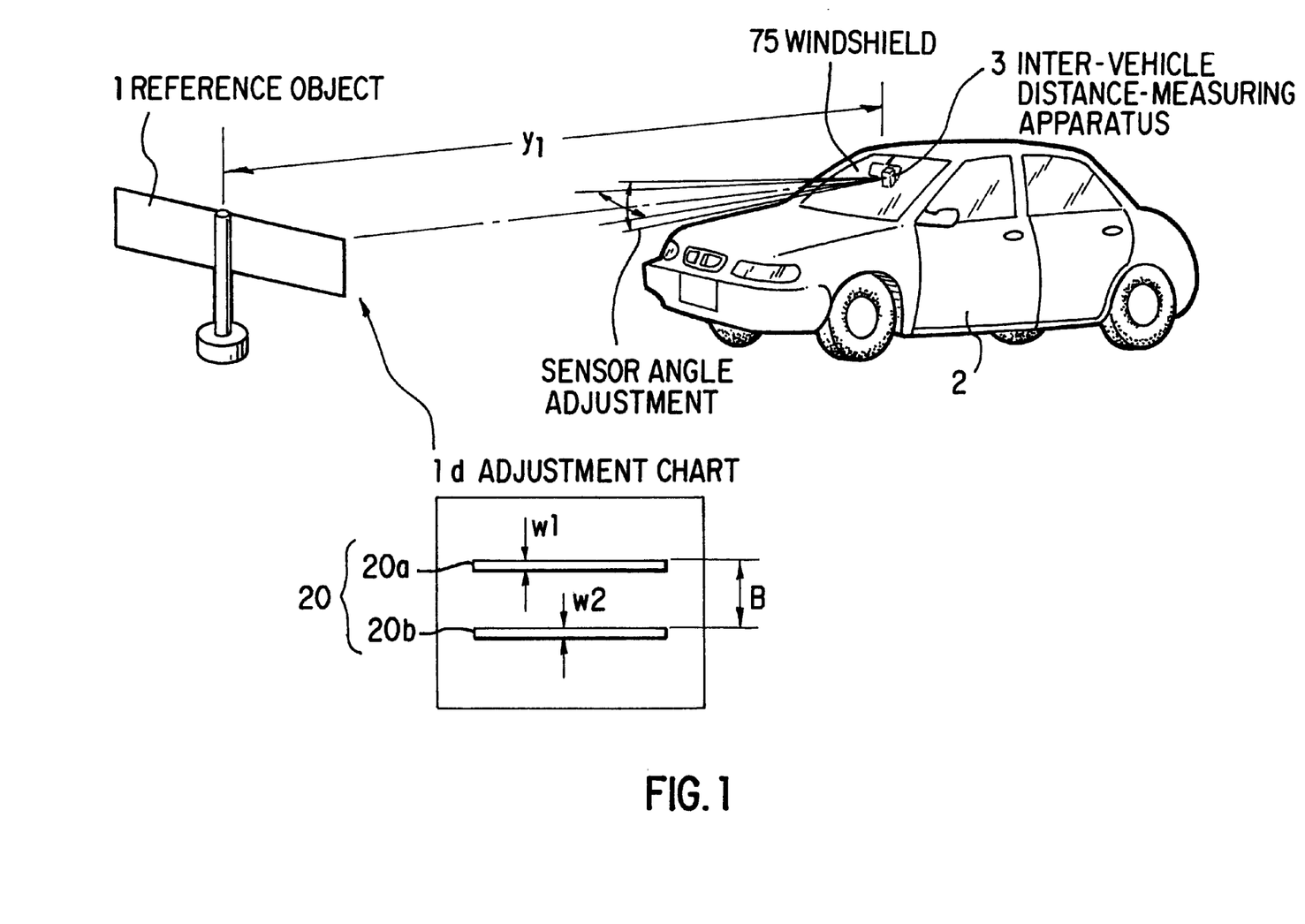
FIG. 1 is a conceptual drawing showing a first embodiment of the invention.

FIG. 1 is a conceptual drawing showing the embodiment.

First, a reference object 1 is placed at an arbitrary distance $y_1$ from an inter-vehicle distance-measuring apparatus 3 mounted in the compartment of a vehicle 2.

An adjustment chart $1d$ is drawn on the reference object 1.

As a pattern 20 in the adjustment chart id, dark horizontal-line patterns 20a and 20b having the same width w1=w2 are located in a distinct field of view at the same interval as the inter-optical-axis distance B (see FIG. 4) between the pair of image-forming lenses 61 and 62 inside the inter-vehicle distance-measuring apparatus 3.

In FIG. 1, the pattern 20 is formed of two horizontal lines, but similar effects can be obtained even if the pattern 20 is formed of three or more horizontal lines, or the chart has a distinct pattern in a dark field of view as long as the pattern has a periodic structure repeated at the same interval B.

Next, images of the adjustment chart $1d$ on the reference object 1 are confirmed to be formed on the photosensor arrays 63 and 64 of the inter-vehicle distance-measuring apparatus 3.

In the embodiment, the calculating means 53 uses the amount of shift detected when the distance to the adjustment chart $1d$ of the reference object 1 is measured, in order to determine the difference in the offsets of the image-forming positions on the photosensor arrays 63 and 64 caused by a medium present between the apparatus and the measured object, and the means 53 determines the distance to the measured object by using the difference in the offsets of the image-forming positions and the amount of shift detected when the distance to the measured object is measured.

The operation of the first embodiment is described with reference to FIGS. 2 and 3.

As described above, the distance (y) to the measured object is expressed by equation 3.

Figure 5:
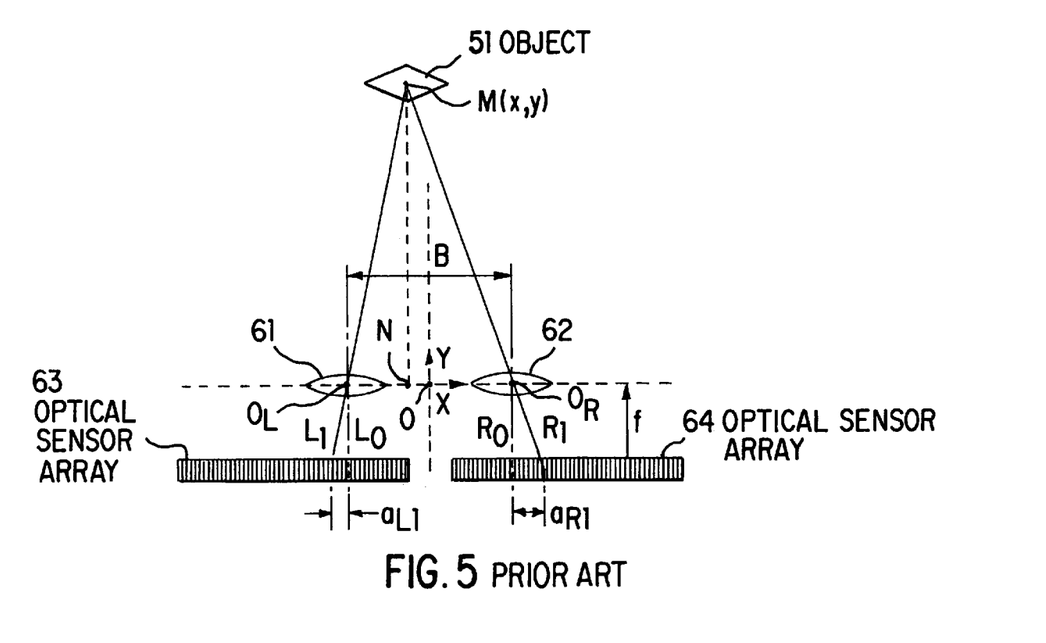
FIG. 5 is an explanatory drawing showing the distance calculation principle.
Figure 6:
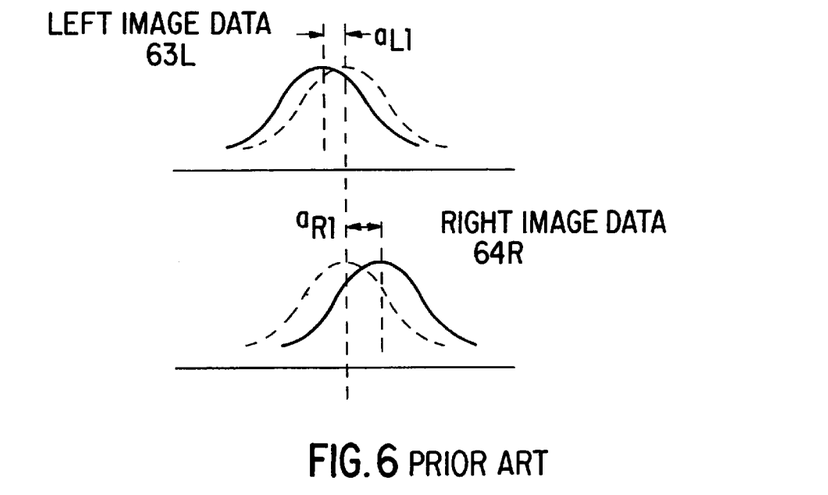
FIG. 6 shows an operation of a distance-detecting circuit.

Theoretically, the amount of shift should be zero if the distance $y_1$ corresponds to a point at infinity, as shown in Equation 3 and FIG. 5.

In case, however, the distance is measured through a medium such as the windshield 75 as shown in FIG. 1, an error is caused by the medium to change the amount of shift from zero to a value S∞.

Thus, the distance (y) to the measured object is expressed by Equation 11 when this error is taken into account.

$$y = B \cdot f/(a_{R1} + a_{L1} - S\infty) \qquad \text{Equation 11}$$

Thus, if the difference in offset S∞ can be measured when the distance $y_1$ corresponds to a point at infinity, the error caused by the medium can be corrected.

Figure 2:
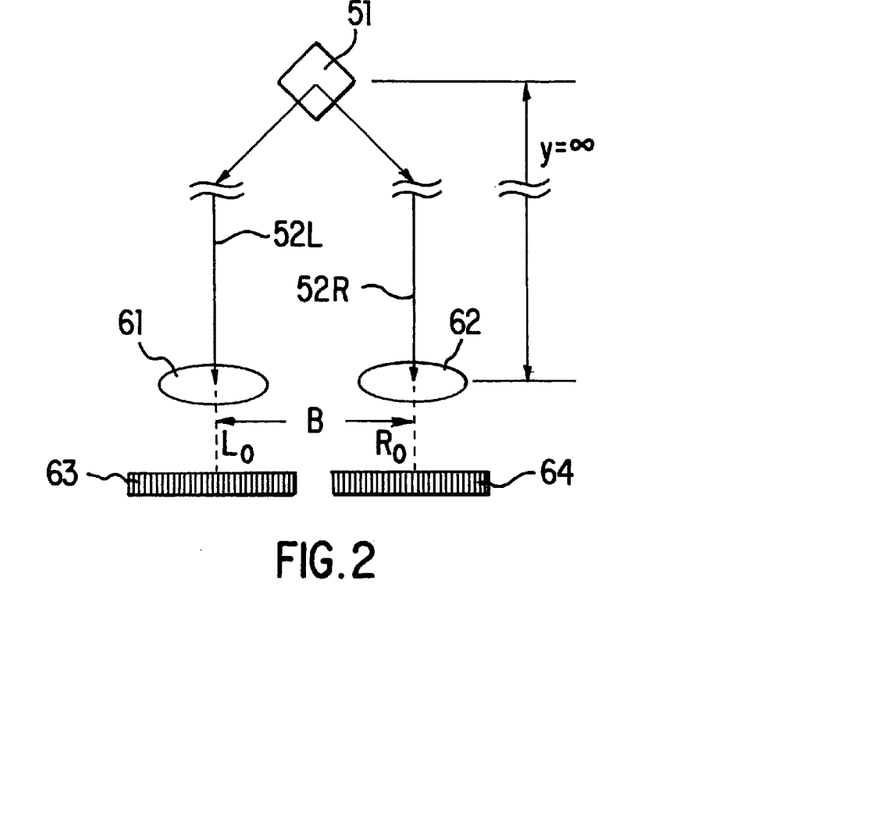
FIG. 2 shows an operation of the first embodiment.

FIG. 2 shows that the measured object 51 is present at a point at infinity relative to the inter-vehicle distance-measuring apparatus 3.

In FIG. 2, in the luminous fluxes incident on the image-forming lenses 61 and 62 from the measured object 51, principle rays 52L and 52R are parallel to each other, and form images on the photosensor arrays 63 and 64 at positions $L_o$ and $R_o$ separated by the inter-optical-axis distance B of the image-forming lenses 61 and 62, respectively.

Figure 3:
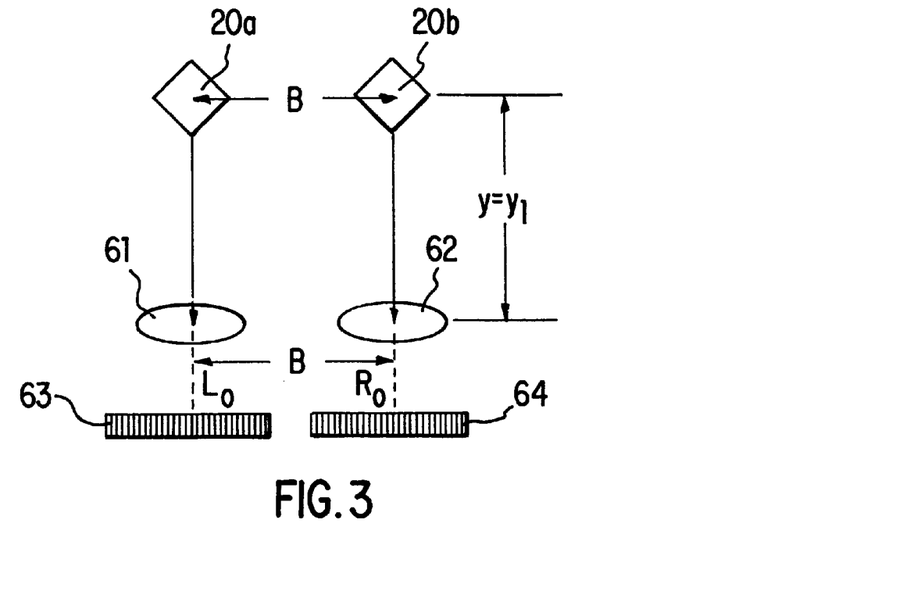
FIG. 3 shows an operation of the first embodiment.

FIG. 3 shows that the adjustment chart $1d$ of the reference object 1 is located at an arbitrary distance $y_1$ from the inter-vehicle distance-measuring apparatus 3.

In FIG. 3, an image of the pattern 20a of the adjustment chart $1d$ is formed on the photosensor array 63 at the position $L_o$, while an image of the pattern 20b is formed on the photosensor array 64 at the position $R_o$.

Since the patterns 20a and 20b have the same shape, the same effects can be obtained as if the reference object 1 was located at a point at infinity.

Thus, the amount of shift obtained when the distance to the adjustment chart $1d$ of the reference object 1 is measured is identical to the difference in the offset S∞ obtained when the measured object 51 is located at a point at infinity relative to the inter-vehicle distance-measuring apparatus 3.

Thus, the difference in the offset S∞ can be determined by measuring a pattern repeated at the same interval as the inter-optical-axis distance B of the image-forming lenses 61 and 62.

The difference in the offset S∞ is stored in the distance-detecting circuit 66 (see FIG. 4).

The calculating means 53 uses the difference in the offset S∞ and the amount of shift when the distance to the measured object is determined, and determines the distance (y) to the measured object based on Equation 11.

The inter-optical-axis distance B of the image-forming lenses 61 and 62 and the focal distance (f) of the image-forming lenses 61 and 62 are generally set to specified values.

The distance (y) to the measured object determined by using Equation 11 is outputted to the exterior as a distance signal S65.

Although the above embodiment has described the correction of the error caused by the windshield 75 present between the inter-vehicle distance-measuring apparatus 3 and the measured object 51, this invention is not limited to this aspect. For example, if a window glass is provided in a light-receiving portion of an enclosure for the inter-vehicle distance-measuring apparatus 3, the error caused by the window glass can also be corrected to enable the distance to the measured object 1 to be measured accurately, thereby eliminating the need to use expensive and accurate glass panes or plastic plates to reduce costs.

In addition, the inter-vehicle distance-measuring apparatus 3 can be used outside the vehicle as a general distance-measuring apparatus. In this case, no medium such as the windshield that causes an error is present between the distance-measuring apparatus and the reference object 1, so that this invention enables the distance-measuring apparatus to be evaluated (confirmation of the distance-measuring accuracy) and the value of B·f to be calculated.

According to the invention, even if a medium such as the windshield is present between the distance-measuring apparatus and the object to be measured, the error in distance measurements caused by the medium can be corrected to provide a distance-measuring apparatus that can measure the distance accurately.

Furthermore, since the accuracy in distance measurements is not affected by a medium such as the windshield, the accuracy does not decrease even if the inter-vehicle distance-measuring apparatus is installed in the compartment of the vehicle that need not be protected from dust or moisture.

The invention set forth in the first aspect enables the distance from the distance-measuring apparatus to the adjustment chart of the reference object to be arbitrarily set in order to save space.

This invention is very simple because the error caused by a medium present between the distance-measuring apparatus and the measured object can be corrected by simply measuring the distance to the adjustment chart of the reference object without the needs for time or labor for positioning the reference object. Further, this invention requires no collimator to reduce costs.

That is, this invention can provide a distance-measuring apparatus that can measure the distance accurately by using an inexpensive and simple apparatus to correct the error caused by a medium, such as a windshield, present between the apparatus and the measured object.

The invention set forth in the second to fourth aspects can determine the direction of the distance-measuring apparatus simply and reliably, thereby providing the distance-measuring apparatus that reduces the burden on the user and accurately measures the distances.

What is claimed is:

1. A distance-measuring apparatus comprising:

photographic means formed of a pair of image-forming lenses and photosensor arrays for taking images of an object through the image-forming lenses; and calculating means electrically connected to the photosensor arrays for calculating a distance to an object to be measured by two images of the object taken by the photographic means based on a triangulation principle, said calculating means calculating the distance to the object by an amount of shift determined based on an inter-optical-axis distance of the pair of image-forming lenses and photographed images of a reference object having a pattern of a periodic structure repeated at an interval same as the inter-optical-axis distance; a difference in offsets of image-forming positions on the photosensor arrays caused by a medium located between the apparatus and the object to be measured, said difference being detected based on the amount of the shift; and an amount of shift detected when the distance to the object is measured.

2. A distance-measuring apparatus according to claim 1, wherein said apparatus further includes a direction adjustment mechanism for adjusting a mounting angle of the distance-measuring apparatus so that images of the reference object are formed at predetermined positions of the photosensor arrays.

3. A distance-measuring apparatus according to claim 1, wherein said apparatus further includes a finder having an optical axis parallel to optical axes of said image-forming lenses.

4. A distance-measuring apparatus according to claim 3, wherein said finder is detachable from the apparatus.

5. A distance-measuring apparatus according to claim 1, wherein the reference object has at least two stripes for forming the pattern, an interval between the stripes being a same as the inter-optical-axis distance.

6. A distance-measuring apparatus comprising:

photographic means formed of a pair of image-forming lenses and photosensor arrays for taking images of an object through the image-forming lenses; and calculating means electrically connected to the photosensor arrays for calculating a distance to an object to be measured by two images of the object taken by the photographic means based on a triangulation principle, said calculating means including first means to store an amount of shift determined based on an inter-optical-axis distance of the pair of image-forming lenses and photographed images of a reference object having a pattern of a periodic structure repeated at an interval same as the inter-optical-axis distance; second means to detect a difference in offsets of image-forming positions on the photosensor arrays caused by a medium located between the apparatus and a measured object, with said difference being detected based on the amount of the shift; and third means to detect an amount of shift detected when the distance to the measured object is measured, the distance to the object to be measured being determined by the amount of shift in the first means, the difference in the second means and the amount of shift of the third means.

* * * * *